United States Patent [19]
Hussong et al.

[11] Patent Number: 5,445,654
[45] Date of Patent: Aug. 29, 1995

[54] BLACK DYE MIXTURES OF FIBER-REACTIVE AZO DYES AND USE THEREOF FOR DYEING HYDROXY- AND/OR CARBOXAMIDO-CONTAINING FIBER MATERIAL

[75] Inventors: Kurt Hussong, Bad Soden am Taunus; Werner H. Russ, Flörsheim am Main; Karl Krieger, Hünstetten, all of Germany

[73] Assignee: Hoechst Aktiengesellschaft, Frankfurt am Main, Germany

[21] Appl. No.: 157,679

[22] Filed: Nov. 24, 1993

[30] Foreign Application Priority Data

Nov. 28, 1992 [DE] Germany .................. 42 40 069.4
Jan. 16, 1993 [DE] Germany .................. 43 01 025.3

[51] Int. Cl.$^6$ .............. C09B 67/22; C09B 67/24; D06P 1/384; D06P 3/10
[52] U.S. Cl. .............................. 8/546; 8/549; 8/639; 8/641; 8/673; 8/681; 8/687
[58] Field of Search .............. 8/543, 546, 549, 639, 8/641, 673–87

[56] References Cited

U.S. PATENT DOCUMENTS

| | | | |
|---|---|---|---|
| 2,657,205 | 1/1950 | Heyna et al. | 8/549 |
| 3,387,914 | 6/1968 | Bohnert et al. | 8/546 |
| 4,072,463 | 2/1978 | Schläfer et al. | 8/546 X |
| 4,257,770 | 3/1981 | Nishimura et al. | 8/549 |
| 4,647,285 | 3/1987 | Scheibli et al. | 8/528 |
| 5,093,483 | 3/1992 | Springer et al. | 534/642 |

FOREIGN PATENT DOCUMENTS

| | | |
|---|---|---|
| 2292955 | 11/1988 | European Pat. Off. |
| 160362 | 9/1983 | Japan |
| 3-065391 | 10/1991 | Japan |
| 86-594 | 6/1988 | Rep. of Korea |
| 2029437 | 3/1980 | United Kingdom |

OTHER PUBLICATIONS

Chemical Abstracts, vol. 112, No. 26, Jun. 25, 1990.
Database WPI Week 8344, Derwent Publications Ltd., London Great Britain of JP 58160362 Sep. 1983.

*Primary Examiner*—Paul Lieberman
*Assistant Examiner*—Margaret Einsmann
*Attorney, Agent, or Firm*—Connolly & Hutz

[57] ABSTRACT

The disclosed black dye mixtures contain 50 to 95% by weight of one or more disazo dyes of the formula (1) and 5 to 50% by weight of one or more monoazo dyes of the formula (2)

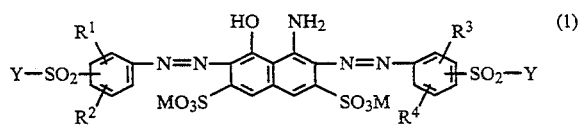

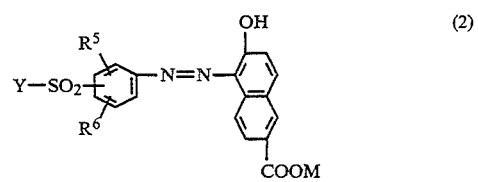

where
  $R^1$, $R^2$, $R^3$, $R^4$, $R^5$ and $R^6$, identical to or different from each other, are each hydrogen, methyl, ethyl, methoxy, ethoxy, sulfo or carboxy,
  Y is in each instance independently of the others vinyl, β-chloroethyl, βthiosulfatoethyl or β-sulfatoethyl, and
  M is hydrogen or an alkali metal.

10 Claims, No Drawings

BLACK DYE MIXTURES OF FIBER-REACTIVE AZO DYES AND USE THEREOF FOR DYEING HYDROXY- AND/OR CARBOXAMIDO-CONTAINING FIBER MATERIAL

DESCRIPTION

Black dye mixtures of fiber-reactive azo dyes and use thereof for dyeing hydroxy- and/or carboxamido-containing fiber material The present invention relates to the field of fiber-reactive dyes.

The present invention provides dye mixtures comprising one or more, such as 1, 2 or 3, disazo dyes conforming to the formula (1), and one or more, such as 1, 2 or 3, monoazo dyes conforming to the formula (2)

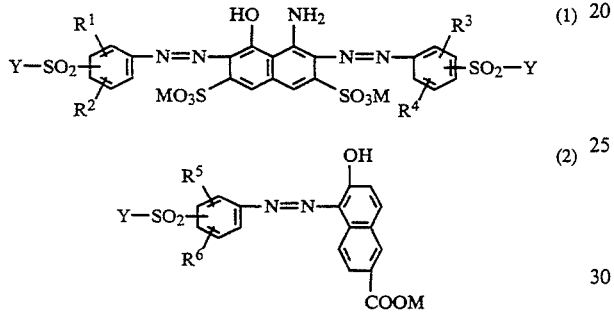

in an amount of from 50 to 95% by weight in respect of the disazo dye(s) of the formula (1) and from 5 to 50% by weight in respect of the dye(s) of the formula (2).

The meanings of the symbols in the formulae (1) and (2) are as follows:

$R^1$ is hydrogen, methyl, ethyl, methoxy, ethoxy, sulfo or carboxy, preferably methoxy and hydrogen and in particular hydrogen, $R^2$ is hydrogen, methyl, ethyl, methoxy, ethoxy, sulfo or carboxy, preferably hydrogen, $R^3$ is hydrogen, methyl, ethyl, methoxy, ethoxy, sulfo or carboxy, preferably methoxy and hydrogen and in particular hydrogen, $R^4$ is hydrogen, methyl, ethyl, methoxy, ethoxy, sulfo or carboxy, preferably hydrogen, $R^5$ is hydrogen, methyl, ethyl, methoxy, ethoxy, sulfo or carboxy, preferably methoxy and hydrogen and in particular hydrogen, $R^6$ is hydrogen, methyl, ethyl, methoxy, ethoxy, sulfo or carboxy, preferably hydrogen, Y is in each instance independently of the others vinyl, β-chloroethyl, β-thiosulfatoethyl or β-sulfatoethyl, M is hydrogen or an alkali metal, such as lithium, sodium and potassium;

the groups —SO₂—Y are preferably bonded to the benzene ring meta or para to the azo group.

The individual symbols appearing in the formulae (1) and (2) can have identical or different meanings within their definition.

The mixtures may additionally comprise a yellow or red shading dye in an amount of up to 10% by weight, preferably up to 5% by weight. Known dyes of this type are for example monoazo dyes conforming to the formulae (a), (b), (c) and (d)

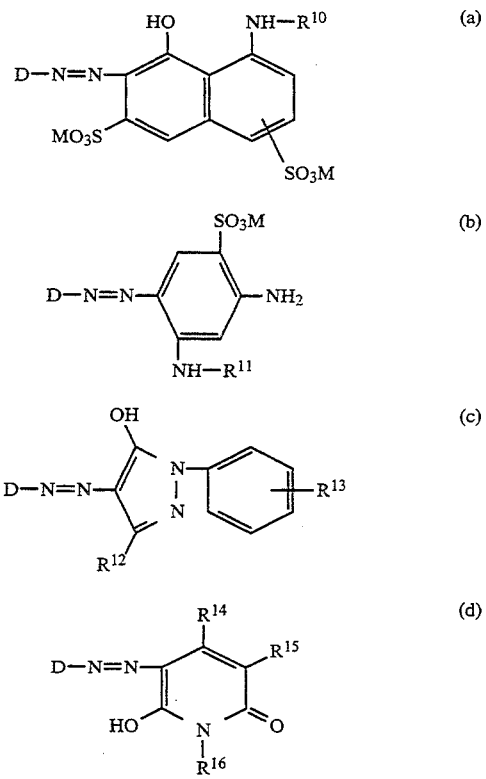

where

D is 3-(β-sulfatoethylsulfonyl)phenyl, 4-(β-sulfatoethylsulfonyl)phenyl, 3-vinylsulfonylphenyl, 4-vinylsulfonylphenyl, 2-methoxy-5-(β-sulfatoethylsulfonyl)phenyl or 2-methoxy-5-vinylsulfonylphenyl, M is as defined above, $R^{10}$ is acetyl, benzoyl, 4,6-dicyanamido-1,3,5-triazin-2-yl, 4-cyanamido-6-(sulfophenylamino)-1,3,5-triazin-2-yl, 4-(N-morpholino)-6-(sulfophenylamino)-1,3,5-triazin-2-yl or 4-(N-morpholino)-6-(sulfophenylamino)-1,3,5-triazin-2-yl, substituted in the benzene ring by methyl or methoxy, $R^{11}$ is acetyl, carbamoyl, 4,6-dicyanamido-1,3,5-triazin-2-yl, 4-cyanamido-6-(sulfophenylamino)-1,3,5-triazin-2-yl, 4-(N-morpholino)-6-(sulfophenylamino)-1,3,5-triazin-2-yl or 4-(N-morpholino)-6-(sulfophenylamino)-1,3,5-triazin-2-yl, substituted in the benzene ring by methyl or methoxy, $R^{12}$ is methyl or carboxy, $R^{13}$ is sulfo, β-chloroethylsulfonyl or β-sulfatoethylsulfonyl, $R^{14}$ is hydrogen or methyl, $R^{15}$ is hydrogen, cyano, carbamoyl, carboxy or sulfomethyl, $R^{16}$ is methyl, ethyl or β-sulfoethyl.

The dyes of the formulae (1) and (2) are well known from the literature, for example the disazo dyes of the formula (1) for example from U.S. Pat. No. 2,657,205 and from Japanese Patent Application Publication Sho-58-160 362 and also from U.S. Pat. No. 4,257,770 and the references cited therein. Monoazo dyes of the formula (2) are described in U.S. Pat. No. 5,093,483.

The mixtures of the dyes of the formulae (1) and (2) preferably comprise the disazo dye(s) of the formula (1)

in an amount of from 60 to 80% by weight and the monoazo dye(s) of the formula (2) in an amount of from 20 to 40% by weight.

A sulfo group is a group of the formula —SO₃M, a carboxyl group is a group of the formula —COOM, a sulfato group is a group of the formula —OSO₃M, and a thiosulfato group is a group of the formula —S—SO₃M.

The dyes of formula (1), and also the dyes of formula (2), in particular if they have the same chromophore, can have, within the meaning of Y, structurally different fiber-reactive groups —SO₂—Y. In particular, the dye mixture can contain dyes of the same chromophore conforming to the formula (1) and/or dyes of the same chromophore conforming to the formula (2) in which the fiber-reactive groups —SO₂—Y are partly vinylsulfonyl groups and partly β-chloroethylsulfonyl or β-thiosulfatoethylsulfonyl or preferably β-sulfatoethylsulfonyl groups. If the dye mixtures contain the respective dye components in the form of a vinylsulfonyl dye, the proportion of the respective vinylsulfonyl dye to the respective β-chloro- or β-thiosulfato- or β-sulfatoethylsulfonyl dye will be up to about 30 mol-%, based on the respective dye chromophore.

Preference is here given to dye mixtures in which the proportion of vinylsulfonyl dye to β-sulfatoethylsulfonyl dye is in terms of the molar ratio between 5:95 and 30:70.

Preference is further given to dye mixtures of one or more disazo dyes conforming to the formula (10) and one or more monoazo dyes conforming to the formula (11)

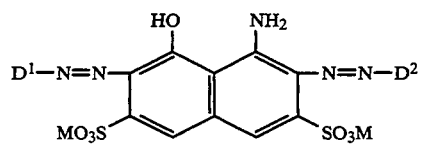

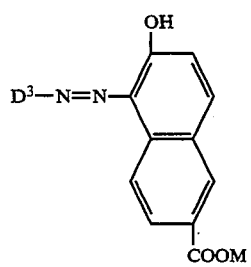

where M is as defined above and D¹, D² and D³ are each independently of the others 3-vinylsulfonylphenyl, 4-vinylsulfonylphenyl, 3-(β-sulfatoethylsulfonyl)phenyl or 4-(β-sulfatoethylsulfonyl)phenyl, and if vinylsulfonyl as well as β-sulfatoethylsulfonyl groups are present in the dye mixtures the molar ratio between the vinylsulfonyl portions and the β-sulfatoethylsulfonyl portions is in a molar ratio between 5:95 and 30:70.

Preference is further given to dye mixtures of one or more dyes of the formula (10) and one or more dyes of the formula (11) in which D¹ and D² are both independently of the other 3-(β-sulfatoethylsulfonyl)phenyl, 4-(β-sulfatoethylsufonyl)phenyl, 3-vinylsulfonylphenyl or 4-vinylsulfonylphenyl and D³ is 2-methoxy-5-(β-sulfatoethylsulfonyl)phenyl or 2-methoxy-5-vinylsulfonylpheny, and if vinylsulfonyl as well as β-sulfatoethylsulfonyl groups are present in the dye mixtures the molar ratio between the vinylsulfonyl portions and the β-sulfatoethylsulfonyl portions is in a molar ratio between 5:95 and 30:70.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dye mixtures will take the form of dye powders containing from 10 to 80% by weight, based on the dye powder or preparation, of a strength-standardizing colorless diluent electrolyte salt. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The dye mixtures of the invention can be obtained in a conventional manner, for instance by mechanically mixing the individual dyes in the required proportions or by synthesis by means of the customary diazotization and coupling reactions using appropriate mixtures of the diazo and coupling components in a manner familiar to those skilled in the art and the necessary proportions. One option is for example to prepare aqueous solutions of the two coupling components 1-amino-8-naphthol-3,6-disulfonic acid and 2-hydroxynaphthalene-6-carboxylic acid and, as diazo components, of the aniline compounds of the formulae (3a), (3b) and/or (4)

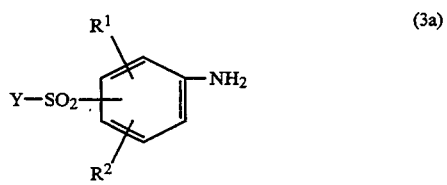

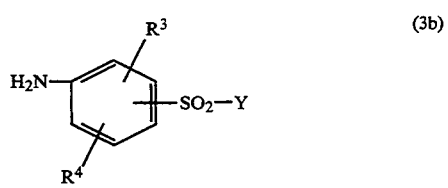

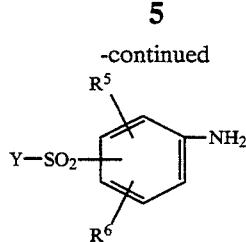

(4)

where $R^1$, $R^2$, $R^3$, $R^4$, $R^5$, $R^6$ and Y are each as defined above, in the appropriate proportions, diazotizing these aniline compounds in a conventional manner in a strongly acid medium and then carrying out the coupling reaction of 1-amino-8-naphthol-3,6-disulfonic acid with one of these diazo components at a pH below 1.5. The second coupling reaction with the monoazo dye product to form the disazo dye is carried out with a further diazo component at a pH between 3 and 6. Then, by addition of the aqueous solution of 2-hydroxynaphthalene-6-carboxylic acid and of a further diazo component, the coupling reaction to form the monoazo dye conforming to the formula (2) is carried out at a pH between 3 and 6. The dye mixture thus obtained can be isolated from the solution in a conventional manner, for example by salting out with an electrolyte salt, such as sodium chloride, potassium chloride or lithium chloride, or by spray drying.

Dye mixtures in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the abovementioned method but also using appropriate vinylsulfonyl starting anilines by reacting the dye mixture in which Y is a β-chloroethyl or β-thiosulfatoethyl β-sulfatoethyl radical with an amount of alkali required for only part of these groups and converting part of said β-substituted ethylsulfonyl groups into vinylsulfonyl groups. This measure is carried out by generally known methods of converting β-substituted ethylsulfonyl groups into the vinylsulfonyl group.

The novel mixtures of the dyes of the formulae (1) and (2) dye hydroxy- and/or carboxamido-containing fiber materials by the application and fixing methods numerously described in the art for fiber-reactive dyes in deep black shades with a good color buildup and good washoff in respect of unfixed dye portions. Moreover, the dyeings obtained are readily dischargeable.

The present invention therefore also provides for the use of the novel dye mixtures for dyeing (including printing) hydroxy- and/or carboxamido-containing fiber materials and processes for dyeing such fiber materials using a dye mixture according to the invention by applying the dye mixture to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols.

Cellulose fiber materials are preferably cotton but can also be other vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6.6, nylon-6, nylon-11 and nylon-4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor at temperatures between 40° and 105° C., optionally at temperatures up to 130° C. under superatmospheric pressure, and optionally in the presence of customary dyeing assistants with the use of acid-binding agents and optionally neutral salts, such as sodium chloride or sodium sulfate, they produce dyeings in very good color yields with excellent color buildup and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers—which can either be carried out in single-phase, for example by printing with a print paste containing sodium bicarbonate or some other acid-binding agent and the colorant, and subsequent steaming at from 100° to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching of this treated material or subsequent steaming or subsequent treatment with dry heat—produce strong prints with well defined contours and a clear white ground. Changing fixing conditions has only little effect on the outcome of the prints. Not only in dyeing but also in printing the degrees of fixation obtained with the dye mixtures of the invention are very high. The hot air used in dry heat fixing by the customary thermofix processes has a temperature of from 120° to 200° C. In addition to the customary steam at from 101° to 103° C. it is also possible to use superheated steam and high pressure steam at up to 160° C.

Acid-binding agents responsible for fixing the dyes to the cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammoniumacetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at a temperature between 60° and 98° C. However, the dyeings can also be carried out at the boil or at temperatures of up to 120° C. (under superatmospheric pressure).

The Examples which follow illustrate the invention. Parts and percentages are by weight, unless otherwise stated. The parts by weight bear the same relation to parts by volume as the kilogram to the liter.

EXAMPLE 1

200 parts of an electrolyte-containing dye powder which contains the navy-dyeing disazo dye of the formula (A)

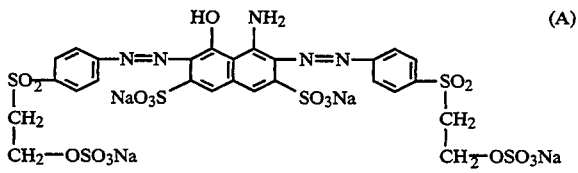

in a proportion of 50% are mechanically mixed with 75 parts of an electrolyte-containing dye powder which contains the golden yellow-dyeing monoazo dye of the formula (B)

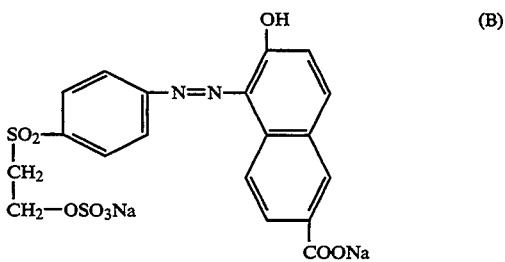

in a proportion of 70%. The resulting dye mixture according to the invention, when employed according to the application and fixing methods customary in the art for fiber-reactive dyes, produces for example on cellulose fiber materials dyeings and prints in deep black shades.

EXAMPLE 2

A dye mixture according to the invention is prepared by adjusting a suspension of 288 parts of 4-(β-sulfatoethylsulfonyl)aniline in 250 parts of water to a pH of from 4.5 to 5 with about 59 parts of sodium carbonate, diazotizing the aniline compound with 143 parts by volume of a 38% strength aqueous sodium nitrite solution following addition of 234 parts by volume of a 30% strength aqueous hydrochloric acid and 400 parts of ice, then adding 112 parts of 1-amino-8-naphthol-3,6-disulfonic acid and carrying the first coupling reaction out at a pH between 1 and 1.3 and at a temperature of below 20° C. (the pH is maintained with about 60 parts of sodium bicarbonate), then adding 57 parts of 2-hydroxynaphthalene-6-carboxylic acid, adjusting with sodium carbonate to a pH of from 5 to 6, and carrying out the coupling reaction at 20° C. and within that pH range.

The result is a black dye solution containing the dyes of the formulae (A) and (B) mentioned in Example 1 in the ratio 68.7%:31.3%.

This dye solution can be adjusted to pH 4.5 by adding 5 parts of a sodium phosphate buffer. By further diluting with water or by evaporating the solution, this liquid dye mixture can then be standardized to the desired strength for a liquid preparation, which in a conventional manner is either used directly as a dyebath or dyeing liquor, optionally following addition of the appropriate amount of an alkaline agent, or used for preparing a dyebath or dyeing liquor. The dye mixture gives deep black dyeings.

EXAMPLE 2a

The method described in Example 2 can be used to prepare a similar dye mixture by varying the amount used of the starting compounds, for example by using the 4-(β-sulfatoethylsulfonyl)aniline in an amount of 280 parts, the 1-amino-8-naphthol-3,6-disulfonic acid in an amount of 102 parts and the 2-hydroxynaphthalene-6-carboxylic acid in an amount of 68 parts. The result obtained is a dye mixture in which the dyes of the formulae (A) and (B) are present in the ratio of about 62.7% :37.3%. The dye mixture can be isolated from the synthesis solution, for example by spray drying, or else be used directly for dyeing as described in Example 2 in the dissolved form of a liquid preparation. Employed according to the application and fixing methods customary in the art it likewise produces, for example on cellulose fiber materials, deep black dyeings.

EXAMPLE 3

To prepare a dye mixture in which some of the dyes have a β-sulfatoethylsulfonyl group while the rest has a vinylsulfonyl group, the solution of the novel dye mixture prepared in Example 2 is used as the starting point. 25% by volume of this solution is separated off, adjusted with sodium carbonate to pH 8 and subsequently stirred at 20° C. for a further 15 minutes, in the course of which the β-sulfatoethylsulfonyl groups are transformed into vinylsulfonyl groups. Thereafter sulfuric acid is used to set a pH of 4.5 and this solution of the vinylsulfonyl dye mixture is added to the original solution of the β-sulfatoethylsulfonyl dye mixture. The result is an aqueous solution of dyes conforming to the formulae (A-1) and (B-1)

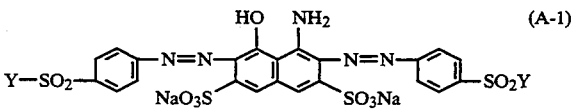

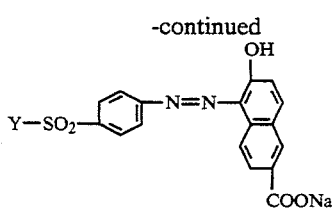

where Y is 25% vinyl and 75% β-sulfatoethyl.

Inorganic salts such as sodium sulfate, which have been additionally brought by this measure into the aqueous dye solutions, can to some extent be isolated by cooling the solution down to 0° C. and filtered off.

The filtrate is adjusted with 5 parts of sodium phosphate buffer to a pH of 4.5. By adding or evaporating water, this aqueous solution can be adjusted to the strength desired for a liquid preparation and be used for dyeing in the manner indicated in Example 2. The application and fixing methods customary in the art for fiber-reactive dyes produce deep black dyeings and prints.

EXAMPLE 4

A dye mixture according to the invention is prepared by adjusting a suspension of 118 parts of 4-(β-sulfatoethylsulfonyl)aniline in 100 parts of water to a pH of from 4.5 to 5 with 20 parts of sodium carbonate, subsequently stirring for some time and then diazotizing with 59 parts by volume of a 38% strength sodium nitrite solution following addition of 100 parts by volume of a 31% strength aqueous hydrochloric acid and 200 parts of ice.

After the diazotization reaction has ended, 134 parts of 1-amino-8-naphthol-3,6-disulfonic acid are added, the first coupling reaction is carried out at a temperature below 20° C. while maintaining a pH of from 1 to 1.3, and the resulting monoazo compound is then isolated by salting out with sodium chloride.

In a separate batch, a solution of 261 parts of 2-methoxy-5-(β-sulfatoethylsulfonyl)aniline and 300 parts of water is admixed with 190 parts by volume of a 31% strength aqueous hydrochloric acid and 300 parts of ice and diazotized by means of 117.5 parts by volume of a 38% strength aqueous sodium nitrite solution. To this diazonium salt solution are then added the monoazo compound obtained as directed above and 79 parts of 2-hydroxynaphthalene-6-carboxylic acid, and the coupling reaction is carried out at a temperature of about 20° C. while maintaining a pH between 5 and 6.

The resulting solution of a novel dye mixture of the dye of the formula (A) and of the dye (C)

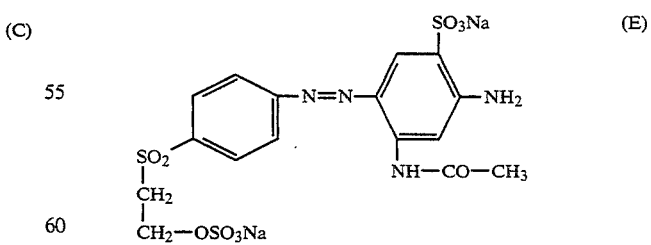

can be put to dyeing use in a conventional manner either directly following isolation of the dye mixture from the synthesis solution by spray drying or by salting out with sodium chloride or directly in the dissolved form. Again, customary application and fixing methods for fiber-reactive dyes produce, for example on cellulose fiber materials, dyeings of a deep black shade.

EXAMPLE 5

A dye mixture according to the invention can be prepared by preparing the disazo dye of the formula (A) and the monoazo dye (D)

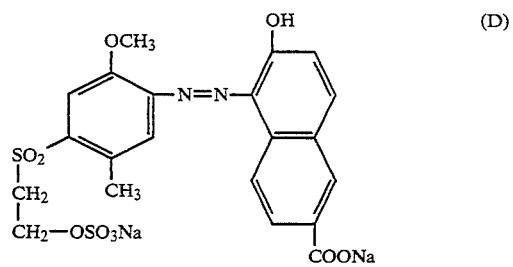

in separate batches in a conventional manner and mixing the two dye solutions in appropriate proportions to form the aqueous solution of a dye mixture according to the invention.

For instance, the disazo dye of the formula (A) can be prepared by diazotizing and coupling the diazonium salt of 292 parts of 4-(β-sulfatoethylsulfonyl)aniline with 159 parts of 1-amino-8-naphthol-3,6-disulfonic acid and the dye of the formula (D) by diazotizing 162.6 parts of 2-methoxy-5-methyl-4-(β-sulfatoethylsulfonyl)aniline and coupling with 94 parts of 2-hydroxynaphthalene-6-carboxylic acid and mixing the two resulting dye solutions. This dye mixture too, employed by the application and fixing methods customary in the art for fiber-reactive dyes, produces for example on cotton deep black dyeings.

EXAMPLE 6

80 parts of an electrolyte-containing dye powder which contains the orange-dyeing monoazo dye of the abovementioned formula (C) in a proportion of 70%, 200 parts of an electrolyte-containing dye powder which contains the navy-dyeing disazo dye of the formula (A) in a proportion of 50% and—for the purpose of shading—20 parts of an electrolyte-containing dye powder which contains the yellow-dyeing monoazo dye of the formula (E)

*(E)* structure: aryl-SO₂-CH₂-CH₂-OSO₃Na group linked via N=N to a phenyl ring bearing SO₃Na, NH₂, and NH-CO-CH₃ substituents.

in a proportion of 50% are mechanically mixed with one another. The dye mixture according to the invention, employed according to the application and fixing methods customary in the art for fiber-reactive dyes, produces for example on cellulose fiber materials dyeings and prints in deep black shades.

EXAMPLE 7

100 parts of an electrolyte-containing dye powder which contains the golden yellow-dyeing monoazo dye of the formula (F)

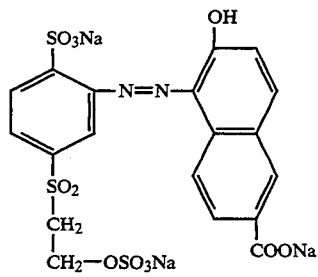

in a proportion of 60%, 200 parts of an electrolyte-containing dye powder which contains the navy-dyeing disazo dye of the formula (A) in a proportion of 50% and—for the purpose of shading—20 parts of an electrolyte-containing dye powder which contains the red-dyeing monoazo dye of the formula (G)

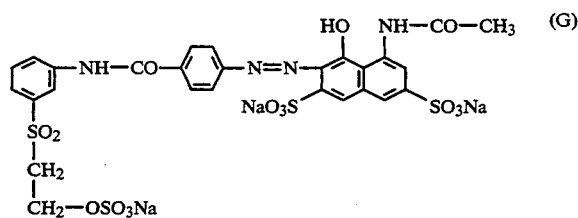

in a proportion of 50% are mechanically mixed with one another. The dye mixture according to the invention, employed by the application and fixing methods customary for fiber-reactive dyes, produces for example on cellulose fiber materials dyeings and prints in deep black shades.

EXAMPLE 8

Example 2a is repeated with the following starting compounds and amounts:

290 parts of 4-($\beta$-sulfatoethylsulfonyl)aniline, 102 parts of 1-amino-8-naphthol-3,6-disulfonic acid, 64 parts of 2-hydroxynaphthalene-6-carboxylic acid and 17 parts of 1-benzoylamino-8-naphthol-3,6-disulfonic acid.

The result is a dye mixture which dyes cellulose fiber materials in a deep black shade.

EXAMPLE 9

72.4 parts of an electrolyte-containing dye powder which contains the navy-dyeing disazo dye of the formula (A) in a proportion of 50% are mechanically mixed with 27.54 parts of an electrolyte-containing dye powder which contains the golden yellow-dyeing monoazo dye of the formula (B) in a proportion of 50%. The resulting dye mixture according to the invention, in which the dyes (A) and (B) are present in a ratio of 2.63:1, produces for example on cellulose fiber materials dyeings and prints in deep black shades when employed by the application and fixing methods customary in the art for fiber-reactive dyes. Not only is the color buildup good, the unfixed dye portions are readily washed off and the dyeing is dischargeable.

EXAMPLES 10 TO 40

The table examples which follow describe further novel dye mixtures of the dyes conforming to the formulae (10) and (11)

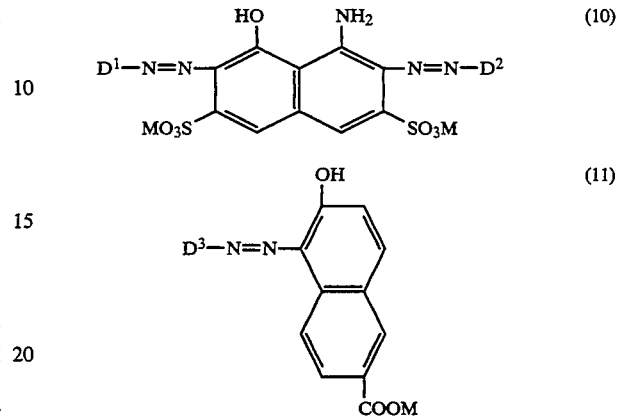

in terms of the components of these dyes (M has one of the abovementioned meanings). In the mixing ratio according to the invention and when employed according to the application and fixing methods customary in the art for fiber-reactive dyes these dye mixtures to produce for example on cellulose fiber materials deep black dyeings.

| | Dye mixture of | | |
|---|---|---|---|
| | Disazo dye (10) | | Monoazo dye (11) |
| Ex. | Radical $D^1$ | Radical $D^2$ | Radical $D^3$ |
| 10 | ditto | 2-carboxy-4-($\beta$-sulfatoethylsulfonyl)phenyl | ditto |
| 11 | 4-($\beta$-sulfatoethylsulfonyl)-2,5-disulfophenyl | 2-methoxy-5-methyl-4-($\beta$-sulfatoethylsulfonyl)phenyl | 4-($\beta$-sulfatoethylfulfonyl)-2,5-disulfophenyl |
| 12 | 2,5-dimethoxy-4-($\beta$-sulfatoethylsulfonyl)phenyl | 4-($\beta$-sulfatoethylsulfonyl)phenyl | 2,5-dimethoxy-4-($\beta$-sulfatoethylsulfonyl)phenyl |
| 13 | 4-($\beta$-sulfatoethylsulfonyl)phenyl | 2-methoxy-5-methyl-4-($\beta$-sulfatoethylsulfonyl)phenyl | 4-($\beta$-sulfatoethylsulfonyl)phenyl |
| 14 | 4-($\beta$-sulfatoethylsulfonyl)phenyl | 2,5-dimethoxy-4-($\beta$-sulfatoethylsulfonyl)phenyl | 4-($\beta$-sulfatoethylsulfonyl)phenyl |
| 15 | 2-methoxy-5-methyl-4-($\beta$-sulfatoethylsulfonyl)phenyl | 4-($\beta$-sulfatoethylsulfonyl)phenyl | 2-methoxy-5-methyl-4-($\beta$-sulfatoethylsulfonyl)phenyl |
| 16 | 4-($\beta$-sulfatoethylsulfonyl)phenyl | 2-sulfo-5-($\beta$-sulfatoethylsulfonyl)phenyl | 4-($\beta$-sulfatoethylsulfonyl)phenyl |
| 17 | 2-sulfo-5-($\beta$-sulfatoethylsulfonyl)phenyl | 4-($\beta$-sulfatoethylsulfonyl)phenyl | 2-sulfo-5-($\beta$-sulfatoethylsulfonyl)phenyl |
| 18 | 2,5-dimethoxy-4-($\beta$-sulfatoethylsulfonyl)phenyl | 2,5-dimethoxy-4-($\beta$-sulfatoethylsulfonyl)phenyl | 4-($\beta$-sulfatoethylsulfonyl)phenyl |
| 19 | 4-($\beta$-sulfatoethylsulfonyl)phenyl | 4-($\beta$-sulfatoethylsulfonyl)phenyl | 2-methoxy-5-($\beta$-sulfatoethylsulfonyl)phenyl |
| 20 | 2-carboxy-4-($\beta$-sulfatoethylsulfonyl)phenyl | 2-carboxy-4-($\beta$-sulfatoethylsulfonyl)phenyl | 2-methoxy-5-methyl-4-($\beta$-sulfatoethylsulfonyl)phenyl |
| 21 | 4-($\beta$- | 4-($\beta$- | 2-carboxy-4-($\beta$- |

-continued

| Ex. | Dye mixture of Disazo dye (10) Radical D¹ | Radical D² | Monoazo dye (11) Radical D³ |
|---|---|---|---|
| | sulfatoethylsulfonyl)phenyl | sulfatoethylsulfonyl)phenyl | sulfatoethylsulfonyl)phenyl |
| 22 | 2-carboxy-4-(β-sulfatoethylsulfonyl)phenyl | 2-carboxy-4-(β-sulfatoethylsulfonyl)phenyl | 4-(β-sulfatoethylsulfonyl)phenyl |
| 23 | 2-methoxy-5-methyl-4-(β-sulfatoethylsulfonyl)phenyl | 2-methoxy-5-methyl-4-(β-sulfatoethylsulfonyl)phenyl | 3-(β-sulfatoethylsulfonyl)phenyl |
| 24 | 2-methoxy-5-(β-sulfatoethylsulfonyl)phenyl | 2-methoxy-5-(β-sulfatoethylsulfonyl)phenyl | 2-methoxy-5-methyl-4-(β-sulfatosulfonyl)phenyl |
| 25 | 2-sulfo-5-(β-sulfatoethylsulfonyl)phenyl | 2-sulfo-5-(β-sulfatoethylsulfonyl)phenyl | 4-(β-sulfatoethylsulfonyl)phenyl |
| 26 | 4-(β-sulfatoethylsulfonyl)phenyl | 4-(β-sulfatoethylsulfonyl)phenyl | 2-sulfo-5-(β-sulfatoethylsulfonyl)phenyl |
| 27 | 2-methoxy-5-methyl-4-(β-sulfatoethylsulfonyl)phenyl | 2-methoxy-5-methyl-4-(β-sulfatoethylsulfonyl)phenyl | 4-(β-sulfatoethylsulfonyl)phenyl |
| 28 | 3-(β-sulfatoethylsulfonyl)phenyl | 3-(β-sulfatoethylsulfonyl)phenyl | 2-methoxy-5-methyl-5-(β-sulfatoethylsulfonyl)phenyl |
| 29 | 3-(β-sulfatoethylsulfonyl)phenyl | 3-(β-sulfatoethylsulfonyl)phenyl | 4-(β-sulfatoethylsulfonyl)phenyl |
| 30 | 2-methoxy-5-(β-sulfatoethylsulfonyl)phenyl | 2-methoxy-5-(β-sulfatoethylsulfonyl)phenyl | 3-(β-sulfatoethylsulfonyl)phenyl |
| 31 | 2-methoxy-5-(β-sulfatoethylsulfonyl)phenyl | 2-methoxy-5-(β-sulfatoethylsulfonyl)phenyl | 2-sulfo-5-(β-sulfatoethylsulfonyl)phenyl |
| 32 | 2-methoxy-5-(β-sulfatoethylsulfonyl)phenyl | 2-methoxy-5-(β-sulfatoethylsulfonyl)phenyl | 2-sulfo-4-(β-sulfatoethylsulfonyl)phenyl |
| 33 | 2-sulfo-5-(β-sulfatoethylsulfonyl)phenyl | 2-sulfo-5-(β-sulfatoethylsulfonyl)phenyl | 4-(β-sulfatoethylsulfonyl)phenyl |
| 34 | 2-sulfo-5-(β-sulfatoethylsulfonyl)phenyl | 2-sulfo-5-(β-sulfatoethylsulfonyl)phenyl | 3-(β-sulfatoethylsulfonyl)phenyl |
| 35 | 4-(β-sulfatoethylsulfonyl)phenyl | 4-(β-sulfatoethylsulfonyl)phenyl | 2-sulfo-5-(β-sulfatoethylsulfonyl)phenyl |
| 365 | 4-(β-sulfatoethylsulfonyl)phenyl | 4-(β-sulfatoethylsulfonyl)phenyl | 3-(β-sulfatoethylsulfonyl)phenyl |
| 37 | 2-methoxy-5-methyl-4-(β-sulfatoethylsulfonyl)phenyl | 2-methoxy-5-methyl-4-(β-sulfatoethylsulfonyl)phenyl | 4-(β-sulfatoethylsulfonyl)phenyl |
| 38 | 2-methoxy-5-methyl-4-(β-sulfatoethylsulfonyl)phenyl | 2-methoxy-5-methyl-4-(β-sulfatoethylsulfonyl)phenyl | 2-sulfo-5-(β-sulfatoethylsulfonyl)phenyl |
| 39 | 4-(β-sulfatoethylsulfonyl)phenyl | 4-(β-sulfatoethylsulfonyl)phenyl | 2,5-disulfo-4-(β-sulfatoethylsulfonyl)phenyl |
| 40 | 4-(β-sulfatoethylsulfonyl)phenyl | 2-carboxy-5-(β-sulfatoethylsulfonyl)phenyl | 4-(β-sulfatoethylsulfonyl)phenyl |

What is claimed is:

1. A dye mixture for preparing black dyeings comprising one or more disazo dyes conforming to the formula (1) and one or more monoazo dyes conforming to the formula (2)

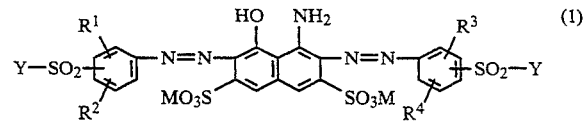

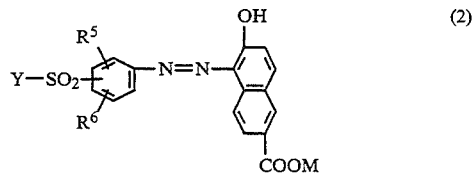

where

R¹, R², R³, R⁴, R⁵ and R⁶, identical to or different from each other, are each hydrogen, methyl, ethyl, methoxy, ethoxy, sulfo or carboxy, Y is in each instance independently of the others vinyl, β-chloroethyl, β-thiosulfatoethyl or β-sulfatoethyl, and M is hydrogen or an alkali metal, said mixture comprising an amount of from 50 to 95% by weight in respect of the disazo dye(s) of the formula (1) and of from 5 to 50% by weight in respect of the dye(s) of the formula (2).

2. The dye mixture of claim 1, wherein the one or more disazo dyes conforming to the formula (1) account for from 60 to 80% by weight and the one or more monoazo dyes conforming to the formula (2) account for from 40 to 20% by weight.

3. The dye mixture of claim 1, wherein R¹, R³ and R⁵ are each independently of one another hydrogen or methoxy and R², R⁴ and R⁶ are each hydrogen.

4. The dye mixture of claim 1, wherein R¹, R², R³, R⁴, R⁵ and R⁶ are each hydrogen.

5. The dye mixture of claim 1, wherein Y is in each instance independently of the others vinyl or β-sulfatoethyl.

6. The dye mixture of claim 1 comprising one or more disazo dyes conforming to the formula (10) and one or more monoazo dyes conforming to the formula (11)

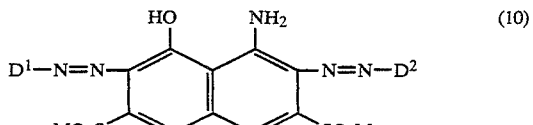

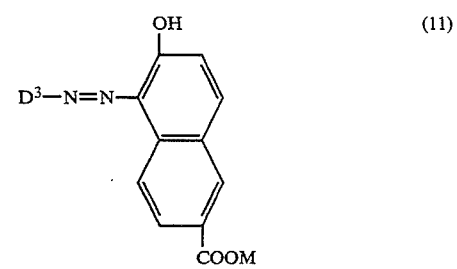

where D¹, D² and D³ are each independently of the others 3-vinylsulfonylphenyl, 4-vinylsulfonylphenyl, 3-(β-sulfatoethylsulfonyl)phenyl or 4-(β-sulfatoethylsulfonyl)phenyl and M is as defined in claim 1.

7. The dye mixture of claim 1 comprising one or more disazo dyes conforming to the formula (10) and one or more monoazo dyes conforming to the formula (11)

(10) 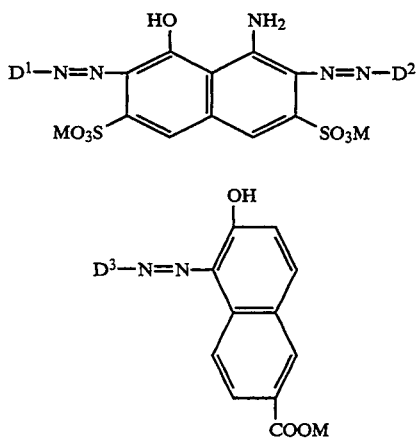

(11)

where $D^1$ and $D^2$ are both independently of the other 3-($\beta$-sulfatoethylsulfonyl)phenyl, 4-($\beta$-sulfatoethylsulfonyl)phenyl, 3-vinylsulfonylphenyl or 4-vinylsulfonylphenyl and $D^3$ is 2-methoxy-5-($\beta$-sulfatoethylsulfonyl)phenyl or 2-methoxy-5-vinylsulfonylphenyl and M is as defined in claim 1.

8. The dye mixture of claim 1, wherein the dyes are present as a mixture of vinylsulfonyl and $\beta$-sulfatoethylsulfonyl dyes and the proportion of vinylsulfonyl dye to $\beta$-sulfatoethylsulfonyl dye is in a molar ratio between 5:95 and 30:70.

9. A method for dyeing a fiber material containing hydroxy or carboxamide groups or both black, comprising the step of dyeing the material black with a dye mixture of claim 1.

10. A method for modifying the color of a dye which produces navy dyeings by formulating a dye mixture, said method comprising:

selecting as the navy-dyeing dye a compound of the formula (1)

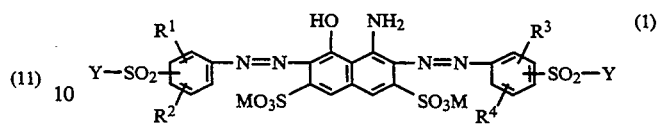

and modifying the coloristic properties of the navy-dyeing dye to obtain a black-dyeing dye mixture by mixing 50 to 95% by weight, of the resulting dye mixture, of a said compound of the formula (1) with 5 to 50% by weight, of the resulting dye mixture, of a compound of the formula (2)

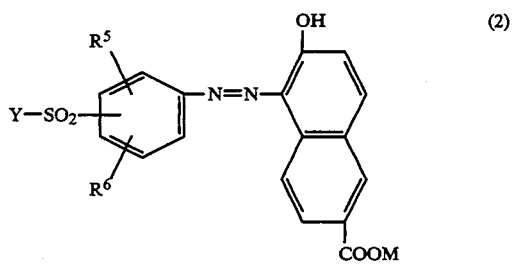

where
$R^1$, $R^2$, $R^3$, $R^4$, $R^5$ and $R^6$, identical to or different from each other, are each hydrogen, methyl, ethyl, methoxy, ethoxy, sulfo or carboxy,
Y is in each instance independently of the others vinyl, $\beta$-chloroethyl, $\beta$-thiosulfatoethyl or $\beta$-sulfatoethyl, and
M is hydrogen or an alkali metal.

* * * * *